United States Patent [19]

Kennedy

[11] 4,236,840
[45] Dec. 2, 1980

[54] INTERNAL RESERVOIRED SOAP DISPENSING ANIMAL WASHER

[76] Inventor: Michael D. Kennedy, 5 Beals St., Brookline, Mass. 02146

[21] Appl. No.: 9,310

[22] Filed: Feb. 5, 1979

[51] Int. Cl.³ .............................................. A46B 11/06
[52] U.S. Cl. ...................................... 401/42; 401/270
[58] Field of Search ................................... 401/24–27, 401/40, 41, 42, 270, 275, 287, 289

[56] References Cited

U.S. PATENT DOCUMENTS

| | | | |
|---|---|---|---|
| 2,502,937 | 4/1950 | Franklin et al. | 401/41 |
| 2,584,631 | 2/1952 | Soss | 401/40 |
| 2,671,691 | 3/1954 | Schnell | 401/40 |
| 3,271,809 | 9/1966 | Morawski | 401/42 |

*Primary Examiner*—John D. Yasko
*Attorney, Agent, or Firm*—Gilbert L. Wells

[57] ABSTRACT

The washing of domestic animals, particularly pets, is facilitated by the brush of the present invention which has reservoirs for animal grooming aids such as soap and cream rinse and a hose connected water supply for applying and removing the grooming aids. The reservoirs are maintained under positive pressure by connection to a back pressure chamber in the head of the brush, finger control valves introduce the grooming aids into a mixing chamber and the mixing chamber is also connected to the back pressure chamber. Vortex generators in the mixing chamber mix together the incoming water and the grooming aids and expel the mixture through holes in the brush at the base of the bristles.

7 Claims, 6 Drawing Figures

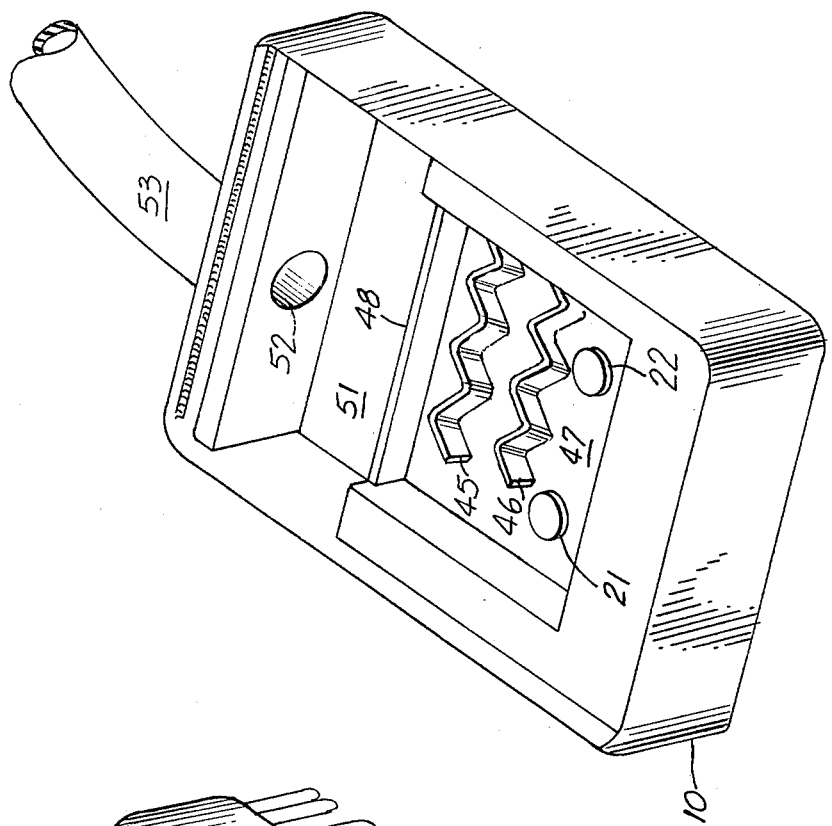
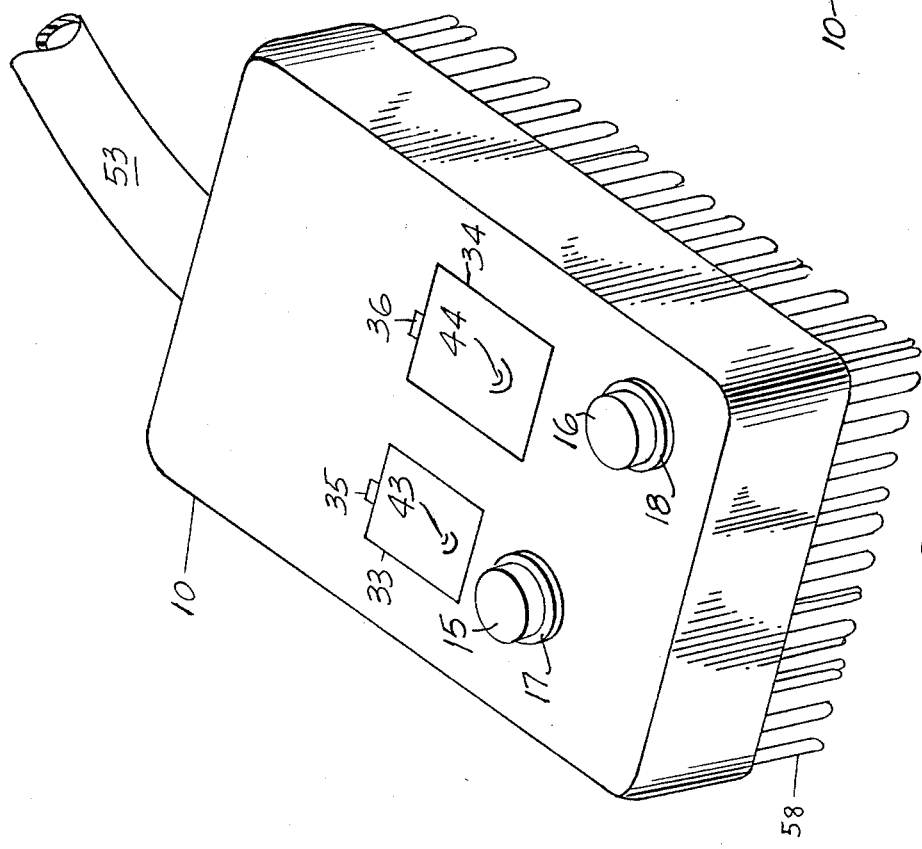

INTERNAL RESERVOIRED SOAP DISPENSING ANIMAL WASHER

The present invention concerns internal reservoired animal washers and, more particularly, a device adapted to receive liquid soap or cream rinse or liquid medicines for topical application in free form or in puncturable and disposable capsules. In addition the design stipulates the ability to accept interchangeability of various length plastic bristles.

It is the purpose of the invention to provide a unique, low cost unit that will result in a cleaner aminal with as minimal effort as possible and reduced consumption of water and cleaning medium and cream rinse. The invention is adaptable to present indoor and outdoor faucets.

Conventional methods for animal washing are, relatively, only partially effective; are cumbersome, exhaustive, time consuming, and extremely wasteful of water and soap.

The majority of domesticated pets have two layers of hair: the top coat being easily cleaned but the undercoat and, consequently, the skin less so.

Some animals may have an intermittent or chronic dermatitis that may have to be kept dry. Immersion in a tub or similar vessel of water or indiscriminate utilization of a hose precludes this oftentimes necessity. The only alternative to this problem is to bathe the pet as little as possible.

Many dogs and cats do not readily tolerate a confined space such as a bathtub or sink in conjunction with immersion in water and can become quite agitated, resulting in water and soap being splashed about and the domestic pet throughly convinced of the undesirability of a bath. A remedy adopted by some domestic pet owners is to take the animal to a professional groomer. This can become an expensive proposition if repeated several times a year. Furthermore, groomers may request an increased fee based on the size or alleged ferocity of a breed of dog.

Another nuisance presented to the pet owner is that soap residue can remain on the hair and skin due to poor or insufficient rinsing, resulting in dryness and flakiness. Finally, loose hair is left on the dog or cat after the bath to be either brushed off or allowed to fall off the animal and collect about the permises.

The internal-reservoired animal washer device of the present invention avoids the deficiencies of prior devices by:

providing a chamber which, when loaded with liquid medium in free form or encapsulated, can be sealed and converted to a positive pressure chamber, without relying on gravity or alleged vacuum due to water flow to induce the liquid cleaning medium to fall into a lower chamber to mix with water. The actions of the positive pressure chamber insures complete utilization of the liquid cleaning medium;

providing the acceptance of pre-measured and pre-mixed/encapsulated liquid medium or pre-mixed/encapsulated liquid medicine for treatment of skin conditions;

providing vortex generators, thus insuring rapid and complete mixing of water with soap, cream rinse, or topically applied liquid skin medicines before exiting from the invention;

providing the ability to remove plastic bristled-platform to allow the removal of accumulated animal hair or to replace the platform with another with different length or type of bristles.

Other objects, advantages and novel features of the invention will become apparent from the following detailed description thereof when considered in conjunction with the accompanying drawings in which like numerals represent like parts throughout and wherein.

FIG. 2 is an external upper surface view of the device, including the external aspect of the sealing doors, fingernail grooves, flexible connectors and the external aspect of the control push button mechanisms and upper surface sealing valves of the positive pressure chambers of the embodiment of FIG. 1;

FIG. 3 is an internal upper surface view of the device including vortex generators, deflecting regulator, back-pressure chamber and exit hole for water entering the back-pressure chamber of the embodiment of FIG. 1;

Figures 1, 5:
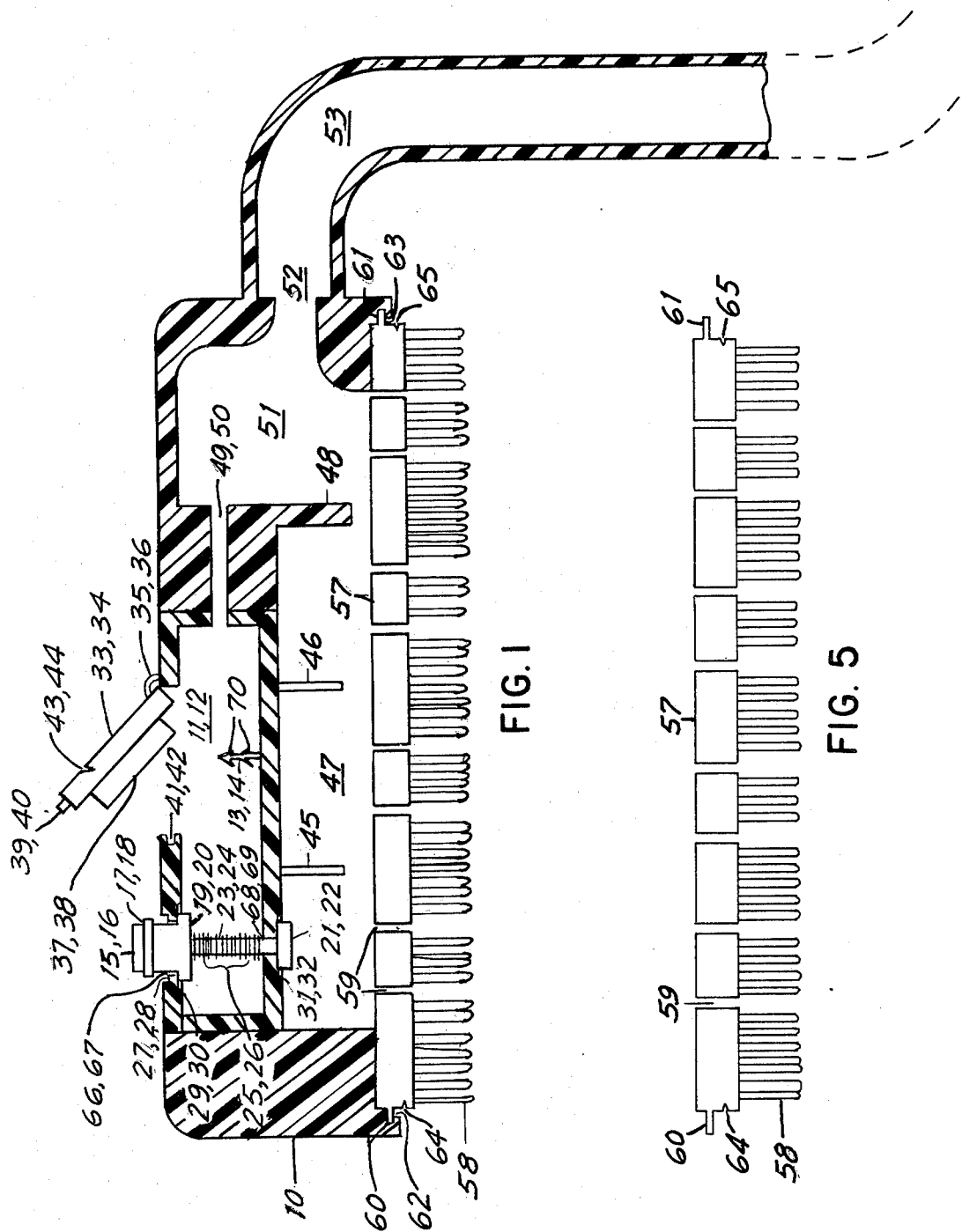
FIG. 1 is a sectional view of one embodiment of the invention.
FIG. 5 is a longitudinal view of the platform and plastic bristles of the embodiment of FIG. 1.
Figure 6:
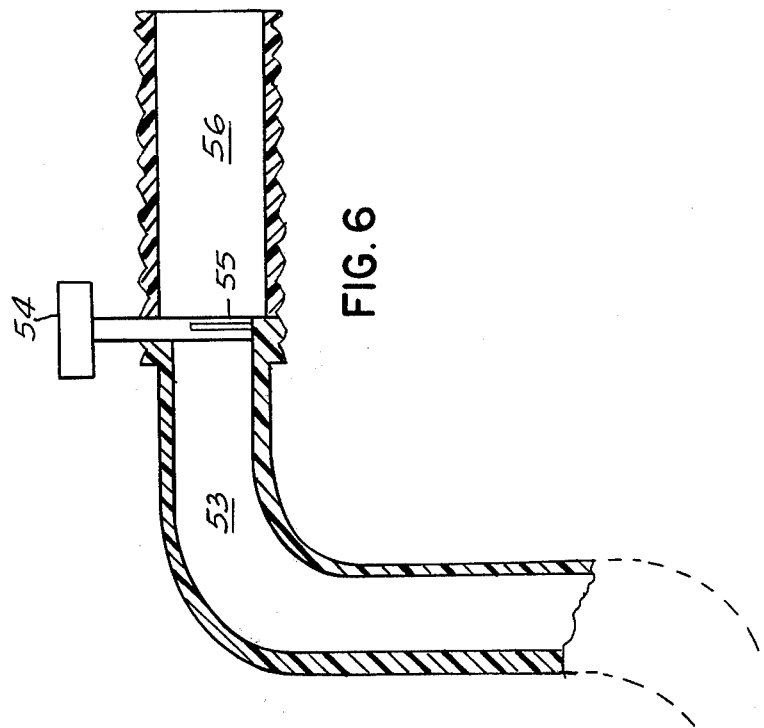
FIG. 6 is a longitudinal sectional view of the hose, water-flow valve, and faucet adapter of the embodiment of FIG. 1.
Figure 4:
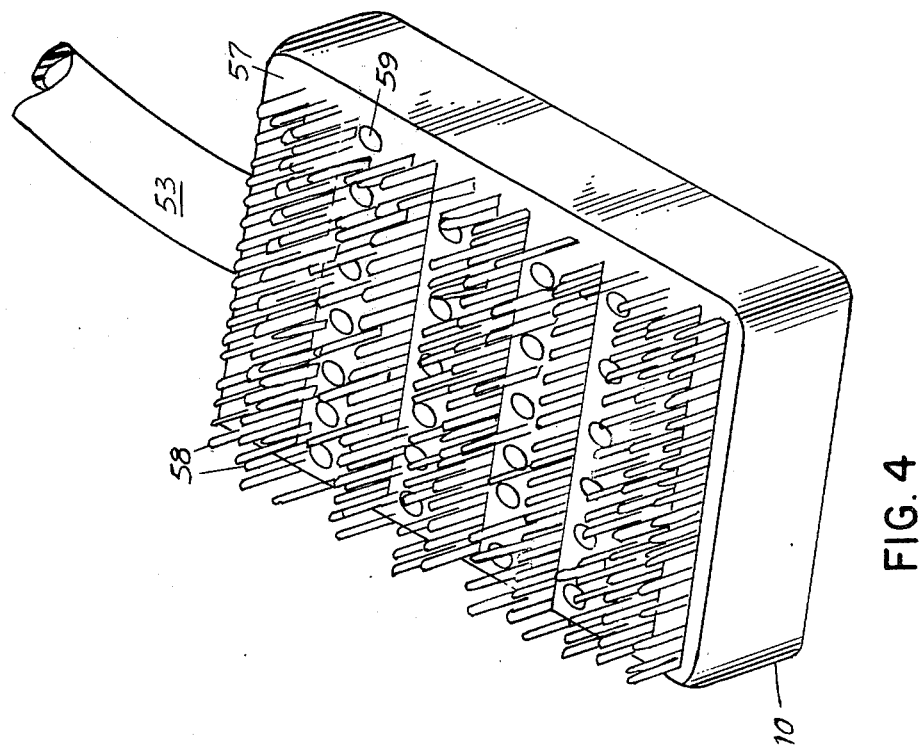
FIG. 4 is an external bottom surface view of the device including detachable variable length plastic bristle platform and optimally located exit holes of the embodiment of FIG. 1.

Refering now to FIG. 1, there is shown an all-plastic rectangular body 10 having two positive pressure chambers 11, 12 and within the positive pressure chambers 11, 12 are located puncturing and capturing impalers 13, 14. The positive pressure chambers 11, 12 are controlled by external push button mechanisms 15, 16 visible on the external upper surface of the body 10, with sealing valves 17, 18 on the external upper surface and around the push button mechanisms 15, 16, sealing valves 19, 20 below the internal upper surface of the positive pressure chambers 11, 12 and sealing valves 21, 22 below the external bottom surface of the positive pressure chambers 11, 12. Located vertically between sealing valves 19, 20 and 21, 22 are vertical rods, 23, 24 in turn surrounded by stainless steel springs 25, 26 offering controlled tension to movement of the rods 23, 24 when depressing and releasing the external control push button mechanisms 15, 16. Situated below and complementing sealing valves 17, 18 are circular grooves 27, 28 which offer a tight seal position for sealing valves 17, 18 when the push button mechanisms 15, 16 are depressed. Situated above and complementing sealing valves 19, 20 are circular grooves 29, 30 which offer a tight seal position for sealing valves 19, 20 when the push button mechanisms 15, 16 are at rest. Situated above and complementing sealing valves 21, 22 are circular grooves 31, 32 which offer a tight seal for sealing valves 21, 22 when the push button mechanisms 15, 16 are at rest.

Connected to the main body 10 are positive pressure chamber 11, 12 sealing doors 33, 34 connected to the main body 10 by plastic hinges 35, 36. Below and connected to the sealing doors 33, 34 are pressure pads 37, 38. At midpoint of the front vertical walls of the sealing doors 33, 34 are located semi-rigid plastic nipples 39, 40 which fit into corresponding grooves 41, 42 located on the main body 10. On the external top surface of each sealing door 33, 34 is located a forty-five degree angled groove 43, 44 for insertion of a fingernail to open the sealing doors 33, 34.

Connected to the external bottom surface of the positive pressure chambers 11, 12 are vortex generators 45, 46. Around and below the vortex generators 45, 46 is the mixing chamber 47. Behind the positive pressure chambers 11, 12 is the deflecting regulator wall 48. Within and through the deflecting regulator wall 48 are the positive pressure conduits 49, 50 which lead to the positive pressure chambers 11, 12. Behind the deflecting regulator wall 48 is the back-pressure chamber 51. To the rear of the back-pressure chamber 51 is the constricted exit hole 52 for the entrance of pressurized water from the hose 53 to the back-pressure chamber 51.

Connected to but detachable from the main body 10 is a hose of ample length 53. Inserted at the base of the hose 53 is a rotating control valve 54 in which is a vertical opening 55 to regulate the flow of water. Connected to the base of the hose 53 is a vertical and detachable faucet adapter 56.

At the base of the main body 10 is connected a detachable platform 57 which has connected to its base flexible plastic bristles 58. In the platform 57 are optimally located exit holes 59 allowing water or soap and water or cream rinse to exit from the mixing chamber 47. Located at both ends of the platform 57 are semiflexible ridges 60, 61 which fit into corresponding grooves 62, 63 in the base of the main body 10. Below the semiflexible ridges 60, 61 are indentations 64, 65 located in the platform 57 for the purpose of insertion of fingernails for the removal of the platform 57. Below sealing valves 17, 18 are passageways 66, 67. Above sealing valves 21, 22 are passageways 68, 69. The barbs 70 on the puncturing and capturing impalers 13, 14 will insure that capsules of soap or cream rinse or liquid medicines do not become free.

In operation, the sealing doors 33, 34 are opened by inserting a fingernail into the angled grooves 43, 44. Liquid soap, cream rinse, or liquid medicines either in free form or encapsulated is loaded into the positive pressure chambers 11, 12. If the liquid medium is in capsule form the capsule will come to rest on top of the puncturing and capturing impalers 13, 14. When the sealing doors 33, 34 are closed the semirigid nipples 39, 40 will snap into the grooves 42, 42 located in the main body 10. Upon closure the pressure pads 37, 38 will force the capsules further onto the puncturing and capturing impalers 13, 14 causing rupture of the capsules. The barbs 70 hold the capsules during deflation insuring that the capsules will not float free and clog passageways 68, 69.

The operator will then attach the variable and detachable faucet adapter 56 to any water faucet and turn on the flow of water. By adjusting the rotating control valve 54 the operator can choose the flow rate of water that will pass through the vertical opening 55 and consequently the hose 53. Water will then pass through the constricted exit hole 52, experience initial pressure, and enter the back-pressure chamber 51. At this point the water will strike the deflecting regulator wall 48 and temporarily accumulate, thus increasing pressure. The water will then take two paths, the main or larger volume passing under the deflecting regulator wall 48 and entering the mixing chamber 47. A smaller volume of water will travel up from the back-pressure chamber 51 to the positive pressure conduits 49, 50 and pass into the positive pressure chambers 11, 12 resulting in an immediate increase in pressure in the positive pressure chambers 11, 12 and an immediate mixing of water and liquid medium, either soap, cream rinse, or medicine, before being discharged from the positive pressure chambers 11, 12 to the mixing chamber 47. The main volume of water, having passed under the deflecting regulator wall 48, will initially strike the floor of the mixing chamber 47 and then deflect upward to strike the vortex generators 45, 46. Because of the location and design of the angles of the vortex generators 45, 46 the water in the mixing chamber 47 is severly agitated before exiting through the exit holes 59 in the platform 57. The severe agitation of the water in the mixing chamber 47 due to the vortex generators 45, 46 will insure absolute mixing of liquid medium and water before exiting from the device. Because of the nature and actions of the deflecting regulator wall 48 and the vortex generators 45, 46 there are no exit holes 59 located below these mechanisms, insuring no loss of pressure under them.

Because of the tight seal of the sealing doors 33, 34 neither soap or water will escape through them. And since water still flows through the hose 53 and enters the back pressure chamber 51 no liquid medium will leave by way of the positive pressure conduits 49, 50. Due to the sealing actions of the sealing valves 19, 20 and circular grooves 29, 30 no water or liquid medium will escape through passageways 66, 67 when the push button mechanisms 15, 16 are at rest.

Added advantages of the actions of the positive pressure conduits 49, 50 are to increase the pressure in the positive pressure chambers 11, 12 by filling the positive pressure chambers 11, 12 with water enabling a complete flushing of the medium in the positive pressure chambers 11, 12 insuring complete usage of the medium. A distinct action of the positive pressure conduits 49, 50 enables the unit to be used in an upside down position by constantly renewing the supply of water to the positive pressure chambers 11, 12 while the liquid medium is released through passageways 68, 69 by depression of the push button mechanisms 15, 16.

As water leaves the mixing chamber 47 through the optimally located exit holes 59 in the detachable platform 57 the operator will rotate the main body 10 back and forth over the animal's hair which will cause the flexible plastic bristles 58 to lift up the outer layer of animal hair and saturate the hair and, in turn, due to the lifting action of the flexible plastic bristles 58, the undercoat and consequently the skin. When desired, the operator can then institute a flow of cleaning medium or cream rinse or liquid medicine by depressing the push button mechanisms 15, 16 resulting in complete mixing of the medium when it enters the mixing chamber 47. By depression of the push button mechanisms 15, 16 sealing valves 17, 18 seal passageways 66, 67 by tightly fitting into the circular grooves 27, 28 thus insuring that no liquid medium will escape from the positive pressure chambers 11, 12 through passageways 66, 67. Due to the lifting action of the flexible plastic bristles 58 the liquid medium will reach the skin, thus guaranteeing a thorough cleaning of the animal. Due to the design and actions of the positive pressure conduits 49, 50 which allow the operator to use the invention in an upside down mode the chest and stomach of the animal receive a thorough cleaning without immersion in water. Controlled depression of the push button mechanism 15, 16 is maintained by the stainless steel springs 25, 26 that surround the rods 23, 24 between sealing valves 19, 20 and sealing valves 21, 22. Since there are two positive pressure chambers 11, 12 one may be utilized for soap and the other for cream rinse.

When the operator has completed the wash cycle he may institute the flow of cream rinse which will rid the hair and skin of soap or, if no cream rinse is utilized, an even flow of water may be maintained to remove soap. The actions of the semiflexible plastic bristles 58 will guarantee a thorough rinse in conjunction with the even flow of water.

An added advantage of the semiflexible plastic bristles 58 is that they have more rigidity than conventional hair bristles and thus will facilitate in the removal of loose and excess hair when the wash and rinse are completed. The operator may use the invention to remove loose hair by stroking the animal with the semiflexible plastic bristles 58 in the direction of the growth of hair, with or without the flow of water. The semiflexible plastic bristles 58, moving in only one direction, will remove loose hair from the animal's body.

An added advantage of the detachable platform is to allow the operator to remove said unit to remove any accumulated animal hair that might have entered by way of the exit holes 59 in the detachable platform 57. Another advantage is allowing the operator to utilize another detachable platform 57 having semiflexible plastic bristles 58 of a different length should an animal have longer or shorter hair. Removal of the detachable platform 57 is facilitated by indentations 64, 65 which will allow the operator to place a fingernail in the indentation 64, 65 at either end and remove the detachable platform 57. The semiflexible ridges 60, 61 will easily snap out of their grooves 62, 63.

The operator will then remove the deflated soap or other medium capsule from the positive pressure chambers 11, 12 by opening the sealing doors 33, 34 and pull out the capsules.

There has thus been provided a device which makes possible simplified, rapid, neat and inexpensive washing of animals. The device allows complete bathing without immersion in a bathtub or indiscriminate use of a gardenhose. It affords the operator the ability to use a specific amount of liquid medium in a manner to insure that no large or bulky vessels are spilled while washing an animal. It guarantees minimal use of water, a valuable resource, a cleaner animal and immediate grooming after wash and rinse.

It will be recognized that many modifications and variations of the present invention are possible in the light of the above teachings. It is therefore to be understood that the invention may be practiced otherwise then as specifically described.

I claim:

1. A dispensing brush comprising:
    (a) a brush head with a forward wall, a rear wall, side walls, a top surface and a bottom surface;
    (b) means for connecting to a supply of water penetrating said rear wall;
    (c) a deflecting regulator wall projecting downwardly from the underside of said top surface a given distance short of said bottom surface, said deflecting regulator wall, said rear wall and said side walls defining a back pressure chamber;
    (d) an intermediate surface positioned between said top surface and said bottom surface and substantially parallel thereto defining reservoir means between said top surface, said intermediate surface and said side walls and a mixing chamber between said intermediate surface, said bottom surface and said side walls;
    (e) a plurality of bristles projecting downwardly from said bottom surface and a plurality of apertures extending through said bottom surface adjacent the basis of said bristles;
    (f) conduit means connecting said back pressure chamber and said reservoir means and said given distance short of said bottom surface defining an opening between said back pressure chamber and said mixing chamber;
    (g) valve means between said reservoir means and said mixing chamber;
    (h) aperture means in said top surface for introducing dispensable material into said reservoir means; and
    (i) said reservoir means further comprising first and second chambers defined by an intermediate wall located in said reservoir means and substantially parallel to said side walls.

2. The dispensing brush of claim 1, wherein said valve means comprise first and second spring loaded valves located in said first and second chambers respectively and seated in apertures in the underside of said intermediate surface and having projections above and through apertures in said top surface.

3. The dispensing brush of claim 2 wherein said aperture means comprise first and second hinged sealing doors above said first and second chambers, respectively.

4. The dispensing brush of claim 3, further comprising first and second impalers located in said first and second chambers respectively.

5. The dispensing brush of claim 4, wherein said mixing chamber has vortex generators defined by vertical plates positioned transversely in said mixing chamber.

6. The dispensing brush of claim 5, wherein said vertical plates have a corrugated configuration.

7. The dispensing brush of claim 6, wherein said means for connecting to a supply of water comprise a hose, a faucet adapter attached thereto and a control valve mounted for rotation therein.

* * * * *